Oct. 28, 1969 T. V. PETERS 3,475,525
PROCESS OF RETICULATING POLYURETHANE FOAMS
Filed Sept. 22, 1966
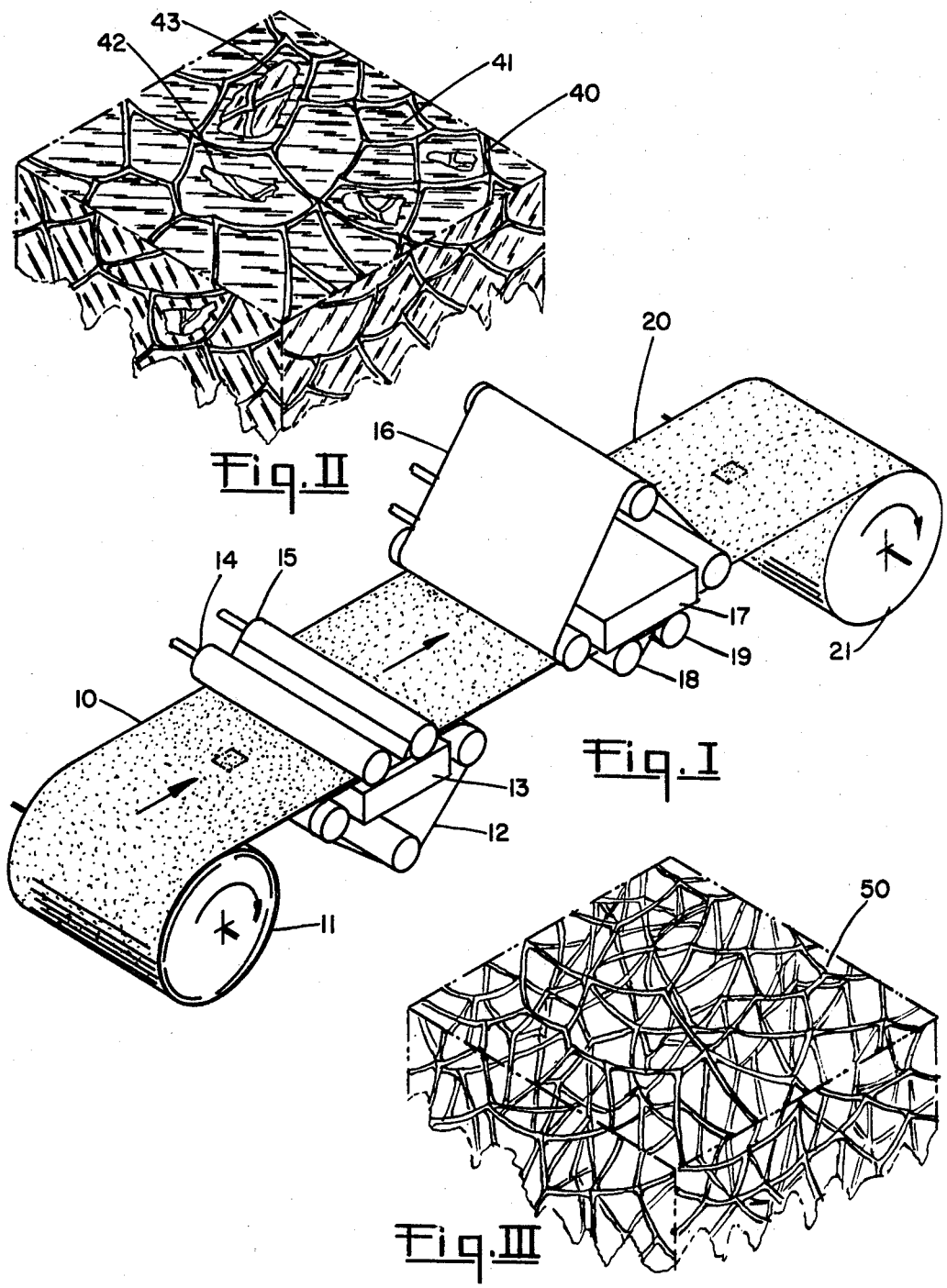
INVENTOR.
TIMOTHY V. PETERS
BY
Davis, Hoxie, Faithfull & Hapgood
ATTORNEYS

United States Patent Office 3,475,525
Patented Oct. 28, 1969

3,475,525
PROCESS OF RETICULATING POLYURETHANE
FOAMS
Timothy V. Peters, Rte. 2, Rockaway Road,
Lebanon, N.J. 08833
Filed Sept. 22, 1966, Ser. No. 581,316
Int. Cl. B29d 27/00; B29c 25/00; B29h 7/20
U.S. Cl. 264—101                                    8 Claims

ABSTRACT OF THE DISCLOSURE

A method of reticulating an open celled polyurethane foam is disclosed which comprises passing a stream of heated gas thruugh the foam in order to heat the foam sufficiently to melt membranous cell walls which span the network strands forming the foam skeletal structure without melting the network strands.

---

This invention relates to a novel process for reticulating open-celled, polyurethane foames. More specifically, it relates to a process in which the thin membranous cell wall material is removed from an open-celled polyurethane foam sheet structure by either selectively melting or thermally degrading said wall material.

Open-celled, polyurethane foams are well-known in the prior art. In an open-celled foam, as opposed to a closed cell foam, at least a portion of the cell wall membranes have either been ruptured or are non-existant. Closed-cell, polyurethane foams are characterized by low porosities, whereas the open-celled foams, depending on the degree of openness, that is, the percentage of cell walls which are either absent or ruptured, may exhibit quite high porosities.

More recently it has been recognized that for many applications the properties of open-celled foams may be greatly enhanced if the membranous cell wall material is substantially removed. The process of removing the membranous material is commonly referred to as reticulation and will be so designated herein.

A number of processes have been proposed for the reticulation of open-celled polyurethane foams. The practice of these processes is claimed to result in the desired structure modifications. They are, however, rather complicated and costly in operation. One method, for example, variously described in Belgian Patent No. 543,362 and United States Patent No. 3,171,820, affects the removal of membranous cell wall material by selectively hydrolyzing the thin membranous material in a base-catalyzed aqueous system. This method has been tested and found to be effective in producing the desired reticulated structure from open-celled polyurethane foams based on polyurethanes which are relatively easily hydrolyzed. Easily hydrolyzible polyurethanes are, for example, those based on poly(ethyleneadipate)glycol, poly(propyleneadipate)glycol, or poly(diethyleneadipate)glycol reacted with a polyisocyanate and water. This method, however, is rather slow and necessitates handling and disposing of relatively large amounts of alkaline solutions. It is also much less effective when applied to foams based on relatively hydrolytically-stable polyurethanes.

A second method described in the prior art involves the long exposure of the open-celled polyurethane foams to non-catalyzed aqueous hydrolytic conditions. This method is impractical for most urethane compositions because of the long time periods required.

In order to effectively and commercially utilize the improved characteristics of reticulated open-celled foams, there is a definite need for a simple, direct, and continuous process for producing such reticulated materials from the open-celled polyurethane foams.

This invention provides a simple and economic method for reticulating open-celled polyurethane foams which is particularly adapted for continuously reticulating a sheet of open-celled polyurethane foam.

Briefly, this invention, in one form, comprises passing a stream of air or other substantially inert gas, heated to a high temperature, through a sheet of open-celled polyurethane foam. In the process of this invention, critical operating conditions are controlled so that the thin membranous material is either melted or thermally decomposed without substantially affecting the interconnected rod-like strands of the polyurethane foam's skeletal structure. This selective removal of membranous material by thermal treatment is possible only if conditions are selected so that the relatively thick interconnecting strands do not absorb sufficient heat to cause significant melting or degradation.

The process of this invention may be better understood by reference to the drawing in which FIGURE 1 is a schematic, isometric projection illustrating the principal elements of the process, FIGURE 2 is an enlarged representation of open-celled foam material prior to reticulation, and FIGURE 3 is an enlarged representation of open-celled polyurethane foam subsequent to reticulation.

Referring specifically to FIGURE 1, an open-celled polyurethane foam 10 is fed from a suitable conventional package and feeding device 11 and advanced by means of a short, porous, conveyor belt 12 comprising, for example, 70 mesh stainless steel screen, across a vacuum box 13. Situated directly above the foam 10 and in register with openings in the vacuum box are two gas applicators 14, 15 which direct a stream of hot, substantially inert gas onto the upper surface of the foam. The upper side of the foam is then contacted with a second porous conveyor belt 16 of similar design to screen belt 12. Another vacuum box 17 is placed above the foam so that the top side of the foam is pulled against the screen belt 16. Directly beneath the foam 10 and in register with the vacuum box are two gas applicators 18, 19 (which may be identical to those shown as 14 and 15) which provide a stream of heated, substantially inert gas. The reticulated foam structure 20 leaving the conveyor 16 is taken up by a suitable conventional winding device on reel 21.

The open cell foam, prior to reticulation, is represented in FIGURE 2. Interconnected strands 40 of polyurethane foam support the thin membranous cell walls 41. In an open cell foam a significant number of these cell walls are ruptured, as at 42, or are substantially non-existant, as at 43.

In the reticulated foam structure represented in FIGURE 3, the interconnecting network strands 50 are shown as a network substantially free of all membranous cell wall material.

A characteristic of this invention is that there is substantially no weight loss when an open-celled polyurethane foam is reticulated by the process of the invention. The thin membranous, cell wall material is liquefied by the thermal conditions employed and resolidifies as a part of the network structure. Depending on the particular polyurethane composition and the conditions employed, the cell wall material also may be partially degraded and remain as a part of the network structure.

The process of this invention is applicable to a variety of polyurethane compositions and structures. The thickness limitations for open-celled sheet structures which may be reticulated by the process of this invention are dependent primarily on the density of the foam and the number of cells per linear inch. If the open-celled foam, for example, has a density of two pounds per cubic foot and approximately 100 cells per linear inch, then sheet thickness must be less than 0.75 inch in order to obtain efficient reticulation by the process of this invention. In the event attempts are made to process such foams having greater thickness, melting and degradation of the network structure at the foam surface becomes severe.

Precise conditions of reticulation are dependent on both the particular urethan composition and the structure of the foam used. Temperature of the air or other substantially inert gas, however, must be at least 250° C., preferably above 300° C. and generally in the range of 400° C. to 800° C. Preferably the heated air or other substantially inert gas should pass through the foam at a linear velocity in excess of one meter per second.

The following examples, wherein all parts are by weight, further illustrate this invention.

EXAMPLE I

An open-celled polyurethan foam was prepared by reacting 95 parts of a 2000 molecular weight poly (neopentyladipate) glycol containing dispersed therein 2% of finely divided titanium dioxide, 5 parts of a 1500 molecular weight hydroxyl-terminated propyleneoxide addition product of glycerol, and 3.2 parts of water with 43 parts of an 8/2 mixture of 2,4 and 2,6-tolylendiiocyanate in the presence of 1 part of a 5 to 1 mixture of N-ethylmorpholine and triethylamine and 0.5 part of a silicone-type surface-active agent marketed by the Dow Corning Company under the trade designation DC-200.

The open-celled polyurethane prepared as described above, having a bulk density of approximately 2 pounds per cubic foot and 100 cells per linear inch, was cut into sheets ½" thick. The open-celled foam sheets were supported on a Teflon-coated, 70 mesh stainless steel screen and passed over a vacuum at a linear rate of 5 meters per minute. Hot air heated to a temperature of 400° C. was directed over the surface of the foam from a height of approximately ¼" above the foam surface at a linear rate of approximately 3 meters per second. After passing under the hot air jet the foam was turned over and passed over the vacuum plate and under the hot air jet a second time.

On microscopic examination no thin, membranous cell wall material was visible in the foam. There was also substantially no weight loss in the processed foam as compared to the original foam.

EXAMPLE II

An open-celled foam was prepared by procedure similar to that shown in Example I except that the 2000 molecular weight poly(neopentyladipate) glycol was replaced by a 2000 molecular weight polytetramethyleneether glycol. This foam was processed under hot air as described in Example I except that the temperature of the air was elevated to 450° C. Microscopic examination of the resulting foam showed that no thin membranous cell wall was visibly present. There was also substantially no weight change during reticulation.

EXAMPLE III

A sample sheet of the same foam described in Example II was placed in a 20% aqueous solution of sodium hydroxide at a temperature of 50° C. and allowed to stand for 2 hours. The foam sheet was then removed and thoroughly washed with water and allowed to air dry. Microscopic examination revealed little difference from the starting foam. That is, there was substantially no reticulation.

EXAMPLE IV

A polyurethane foam supplied by Reeves Brothers, Inc. of the trade designation Curon 508D, having an approximate density of 2 pounds per cubic foot, a thickness of approximately ¼" and approximately 100 cells per linear inch was reticulated by the procedure described in Example I except that the linear rate of the foam across the vacuum and hot air jet was 10 meters per minute. Microscopic examination of the foam revealed no membranous cell material present in the processed foam. There was a small weight loss of approximately 0.2%.

It can be seen that this invention provides a process for reticulating open-celled polyurethane foams which is rapid and economical and which is adaptable for continuous, automated, operation.

I claim:
1. A method of reticulating an open celled polyurethane foam having a skeletal structure formed of a network of strands and membranous cell walls spanning the network strands comprising passing a stream of heated gas, inert with respect to said foam, through said foam from one side to the other, said foam being heated to a temperature sufficient to melt the membranous cell walls without melting the network strands.

2. The method of claim 1 including the step of applying a vacuum source on one side of said foam and applying said gas to the opposite side of said foam, the vacuum drawing said gas through said foam.

3. The method of claim 1 wherein said gas is heated to a temperature above 250° C.

4. The method of claim 3 wherein said temperature is in the range of 400° C.–800° C.

5. The method of claim 1 including the step of passing a second stream of heated inert gas through said foam in a direction different from the direction of flow of the first stream of heated gas.

6. A method of reticulating an open celled polyurethane foam having a skeletal structure formed of a network of strands and membranous cell walls spanning the network strands comprising the steps of
   (a) feeding said foam to a first station and locating said foam between a vacuum source and a source of heated gas inert with respect to said foam,
   (b) passing said gas through said foam from a first side through a second side thereof,
   (c) feeding said foam to a second station and locating said foam between a vacuum source and a source of heated inert gas, and
   (d) passing said heated inert gas to said foam from said second side to said first side, said foam being heated to a temperature sufficient to melt the membranous cell walls without melting the network strands.

7. The method of claim 6 wherein said gas is heated to a temperature above 250° C.

8. The method of claim 6 wherein said gas is air heated to a temperature in the range of 400° C.–800° C.

References Cited

UNITED STATES PATENTS

| | | | |
|---|---|---|---|
| 3,175,025 | 3/1965 | Geen et al. | 264—80 |
| 3,329,759 | 7/1967 | Rice | 264—321 |
| 3,390,106 | 6/1968 | Geen et al. | 260—2.5 |

FOREIGN PATENTS

| | | |
|---|---|---|
| 816,136 | 7/1959 | Great Britain. |

DONALD J. ARNOLD, Primary Examiner

P. LEIPOLD, Assistant Examiner

U.S. Cl. X.R.

264—85, 321, 345